US009558229B2

(12) United States Patent
Lee et al.

(10) Patent No.: US 9,558,229 B2
(45) Date of Patent: Jan. 31, 2017

(54) TRANSACTION PRIVATE LOG BUFFERING FOR HIGH PERFORMANCE OF TRANSACTION PROCESSING

(71) Applicants: Juchang Lee, Seoul (KR); Beomsoo Kim, Walldorf (DE); Kyu Hwan Kim, Seoul (KR); Jaeyun Noh, Seoul (KR); Sang Kyun Cha, Seoul (KR)

(72) Inventors: Juchang Lee, Seoul (KR); Beomsoo Kim, Walldorf (DE); Kyu Hwan Kim, Seoul (KR); Jaeyun Noh, Seoul (KR); Sang Kyun Cha, Seoul (KR)

(73) Assignee: SAP SE, Walldorf (DE)

(*) Notice: Subject to any disclaimer, the term of this patent is extended or adjusted under 35 U.S.C. 154(b) by 72 days.

(21) Appl. No.: 14/244,686

(22) Filed: Apr. 3, 2014

(65) Prior Publication Data

US 2015/0149704 A1    May 28, 2015

Related U.S. Application Data

(60) Provisional application No. 61/909,317, filed on Nov. 26, 2013.

(51) Int. Cl.
*G06F 12/08* (2016.01)
*G06F 17/30* (2006.01)
*G06F 9/46* (2006.01)

(52) U.S. Cl.
CPC ......... *G06F 17/30368* (2013.01); *G06F 9/466* (2013.01); *G06F 12/08* (2013.01); *G06F 2206/1014* (2013.01)

(58) Field of Classification Search
CPC  G06F 2206/1014; G06F 3/061; G06F 3/0656; G06F 3/06; G06F 3/0655; G06F 3/0628; G06F 3/0601
See application file for complete search history.

(56) References Cited

U.S. PATENT DOCUMENTS

| | | | | |
|---|---|---|---|---|
| 5,455,944 | A  * | 10/1995 | Haderle | G06F 9/466 |
| 5,778,388 | A  * | 7/1998  | Kawamura | G06F 11/1466 |
| 6,353,820 | B1 * | 3/2002  | Edwards | G06F 17/30336 |
| | | | | 707/696 |
| 7,502,775 | B2 * | 3/2009  | Carroll | G06F 17/30587 |
| 2001/0056438 | A1* | 12/2001 | Ito | G06F 17/30289 |
| 2002/0116404 | A1* | 8/2002  | Cha | G06F 11/1471 |
| 2002/0174136 | A1* | 11/2002 | Cameron | G06F 17/30595 |
| 2002/0198899 | A1* | 12/2002 | Yamaguchi | G06F 17/30575 |
| 2003/0061537 | A1* | 3/2003  | Cha et al. | 714/16 |
| 2003/0120669 | A1* | 6/2003  | Han | G06F 11/1666 |
| 2004/0010499 | A1* | 1/2004  | Ghosh et al. | 707/100 |
| 2004/0054643 | A1* | 3/2004  | Vemuri et al. | 707/1 |
| 2004/0230621 | A1* | 11/2004 | Croisettier | G06F 17/30371 |
| 2005/0210073 | A1* | 9/2005  | Oeda | G06F 11/1471 |
| 2005/0289198 | A1* | 12/2005 | Todd | G06F 17/30578 |

(Continued)

*Primary Examiner* — Jared Rutz
*Assistant Examiner* — Jean Edouard
(74) *Attorney, Agent, or Firm* — Mintz Levin Cohn Ferris Glovsky and Popeo, P.C.

(57) ABSTRACT

For each data change occurring transaction created as part of a write operation initiated for one or more tables in a main-memory-based DBMS, a transaction log entry can be written to a private log buffer corresponding to the transaction. All transaction log entries in the private log buffer can be flushed to a global log buffer upon completion of the transaction to which the private log buffer corresponds.

14 Claims, 3 Drawing Sheets

(56) References Cited

U.S. PATENT DOCUMENTS

| | | | |
|---|---|---|---|
| 2006/0004860 A1* | 1/2006 | Liedes | G06F 11/1471 |
| 2006/0010170 A1* | 1/2006 | Lashley | G06F 12/0813 |
| 2006/0085591 A1* | 4/2006 | Kumar et al. | 711/113 |
| 2006/0123004 A1* | 6/2006 | Rapp | G06F 17/30362 |
| 2006/0123065 A1* | 6/2006 | Rapp | G06F 17/30362 |
| 2006/0167895 A1* | 7/2006 | Shim | G06F 12/08 |
| 2008/0228834 A1* | 9/2008 | Burchall et al. | 707/202 |
| 2009/0157764 A1* | 6/2009 | Kundu et al. | 707/202 |
| 2009/0164750 A1* | 6/2009 | Atri et al. | 711/209 |
| 2009/0287874 A1* | 11/2009 | Rogers et al. | 711/103 |
| 2010/0161886 A1* | 6/2010 | Toelkes et al. | 711/103 |
| 2011/0179000 A1* | 7/2011 | Shaughnessy | 707/703 |
| 2011/0252000 A1* | 10/2011 | Diaconu | G06F 17/30501 707/638 |
| 2012/0072395 A1* | 3/2012 | Lynn | 707/648 |
| 2013/0013602 A1* | 1/2013 | Manner | A23G 1/0066 707/737 |
| 2013/0117234 A1* | 5/2013 | Schreter | 707/674 |
| 2013/0117236 A1* | 5/2013 | Schreter | 707/682 |
| 2013/0124254 A1* | 5/2013 | Jafri | G06Q 10/06316 705/7.26 |
| 2013/0151895 A1* | 6/2013 | Lee | G06F 11/1658 714/19 |
| 2014/0157048 A1* | 6/2014 | Graefe | 714/16 |

* cited by examiner

TRANSACTION PRIVATE LOG BUFFERING FOR HIGH PERFORMANCE OF TRANSACTION PROCESSING

CROSS-REFERENCE TO RELATED APPLICATION

The current application claims priority under 35 U.S.C. §119(e) to U.S. Provisional patent application Ser. No. 61/909,317 filed on Nov. 26, 2013, the disclosure of which is incorporated by reference herein in its entirety.

TECHNICAL FIELD

The subject matter described herein relates to database management systems in general and, more particularly, to improving performance in such systems.

BACKGROUND

In general, transaction processing in a main memory-based database management system (DBMS) occurs with significantly faster performance than in disk-based DBMS. This improvement can be realized at least in part through retention of data in main memory, which reduces the need for read/write operations to move data between main memory and persistent storage (e.g. hard drives, solid state drives, optical drives, magnetic drives, etc.) for execution of various databases functions (e.g. table joins, queries, reads, writes, deletions, etc.). Transaction processing in disk-based DBMS can generally consume significant execution time waiting for completing disk input and output (I/O) operations. In contrast, in a main memory-based DBMS (e.g. an "in-memory" database management system), resolution of conflicts between transactions and waiting for completion of disk I/O occurs fairly rarely. As a consequence, context switching overhead for resolving conflicts is greatly reduced in main memory-based DBMS, which can also offer faster response and higher performance of transaction processing.

Ensuring reliability in a disk-based DBMS is typically achieved by logging and use of a crash recovery algorithm. Similar crash recovery algorithms can also be used in a main memory-based DBMS. Due to the volatility of main memory data storage (e.g. DRAM) that loses all data when the power is interrupted or switched off, a failure of a machine or operating system can potentially cause a complete loss of all data. Therefore, a typical approach involves logs of changes occurring as a result of a transaction being stored to non-volatile storage (e.g. hard disk drives, solid state drives, optical drives, etc.) in the order in which they were created. This approach is referred to as transaction logging. If a database server is taken out of service due to an unscheduled event, log entries read from the non-volatile storage are replayed into the database to support creation of a consistent state of the database.

SUMMARY

Consistent with one or more implementations of the current subject matter, bottlenecks for transaction logging can be reduced or optimally eliminated to gain higher performance and better reliability in in-memory database systems. In one non-limiting aspect, implementations of the current subject matter can include creating, one or more transactions as part of a write operation initiated for one or more tables in a main-memory-based DBMS, writing a transaction log entry to a private log buffer for each data change occurring during a transaction of the one or more transactions, and flushing all transaction log entries in the private log buffer to a global log buffer upon completion of the transaction to which the private log buffer corresponds.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an in-memory database management system, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
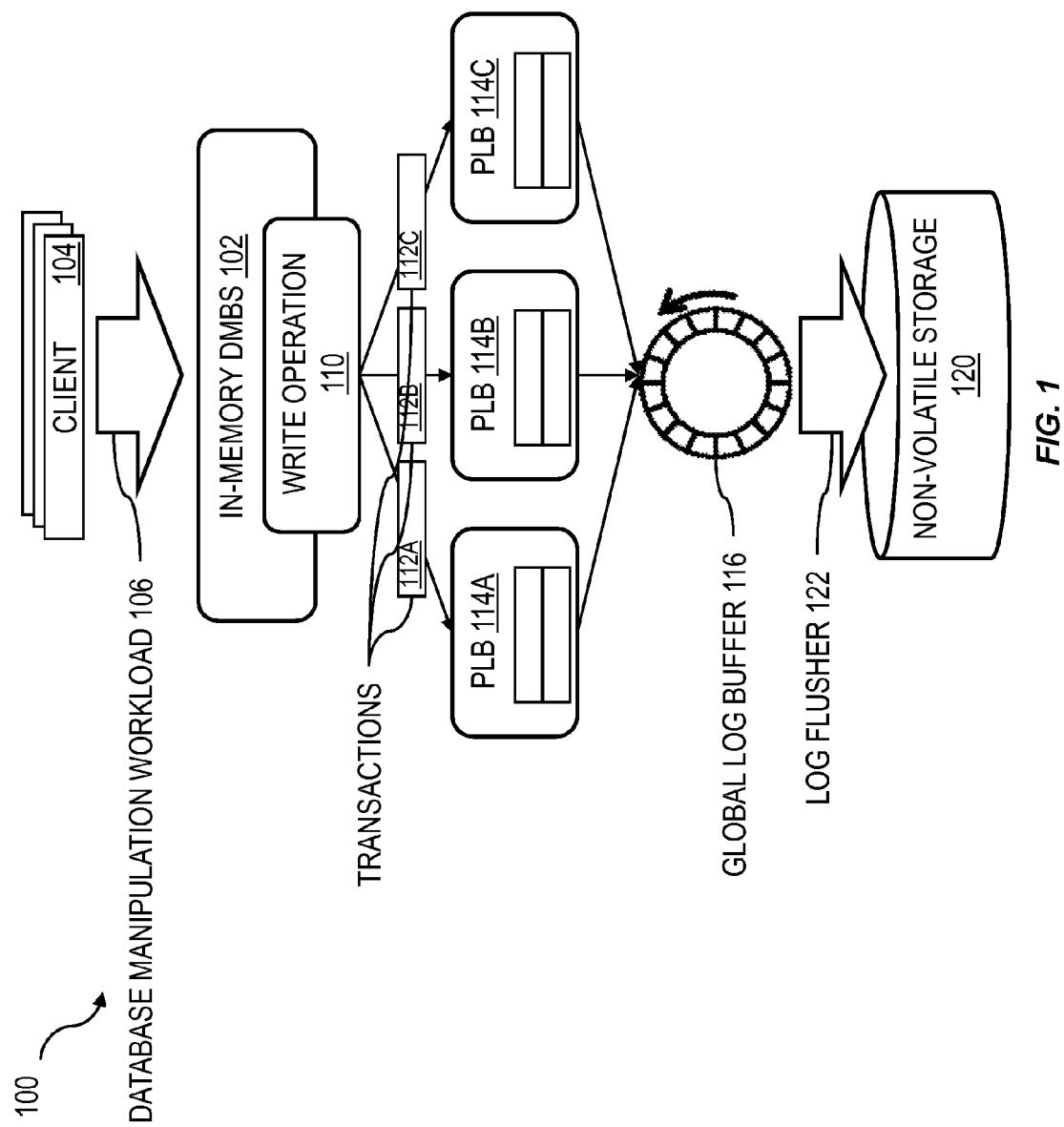
FIG. 1 shows a diagram illustrating aspects of a DBMS showing features consistent with implementations of the current subject matter.

Transaction logging (e.g. maintaining a history of actions executed by a database management system to guarantee atomicity, consistency, isolation, and durability properties) between main memory and non-volatile storage can create a significant performance bottleneck in a main memory-based DMBS. In general, there is a trade-off between high performance of transaction processing and reliability. Bottlenecks in transaction logging in a main memory-based DBMS can result from a situation in which a latch contention arises in a global redo log buffer between transactions. A global redo log is a shared memory structure holding information about changes made to the database. Another situation that can result in a bottleneck arises from a high frequency of events that must wait for completion of a disk I/O according to the amount of logging or the number of disk I/O operations pending.

Elimination or reduction in importance of existing bottlenecks for transaction logging can provide improved performance. Methods, systems, articles of manufacture, and the like consistent with one or more implementations of the current subject matter can, among other possible advantages, provide transaction private log buffering approaches as discussed below that represent one or more improvements relative to current approaches.

Transaction private log buffering can be used consistent with the descriptions herein to guarantee reliability, and also to eliminate or minimize the effect of the aforementioned factors that can result in performance-degrading bottlenecks. In this manner, improved performance of transaction processing can be realized relative to existing approaches.

Reliability can be provided concurrently with elimination or reduction of performance bottlenecks through guaranteeing atomicity and durability for transactions in a main memory-based DMBS.

Guaranteeing atomicity and durability using transaction logging and crash recovery can support reliability of a main memory-based DMBS. In other words, guaranteeing reliability of a main memory-based DMBS generally follows a "write ahead log" (WAL) protocol and a "force log at commit" (FLAC) rule.

In a system using the WAL protocol, all modifications of an uncommitted transaction are written to an undo log before they are applied to non-volatile storage. An example of an uncommitted transaction is a write transaction that is in the middle of performing an operation when the main memory-based DMBS upon which it is running loses power. Upon restart, the DBMS would need to know whether the operation it was performing at the time of power loss had succeeded, partially-succeeded, or failed. If all modification of the write transaction had written to disk before the main memory-based DMBS lost power and the undo log entries had not, then it would not be possible for the transaction to be aborted due to a lack of undo information, and the main memory-based DMBS would not be restorable to a consistent state. In other words, to follow the WAL protocol guarantees atomicity of transactions.

During a commit operation, all redo log entries of a write transaction can be written to non-volatile storage perfectly. This approach can guarantee that durability of transactions that have committed will survive permanently. Upon restart, a main memory-based DMBS can be moved back to a consistent state through a crash recovery process for replaying redo log entries read from the non-volatile storage.

Consistent with implementations of the current subject matter, redo log entries of a write transaction that has only partially completed an operation can be stored temporarily to a private log buffer in the context of the transaction when the WAL protocol and the FLAC rule are not violated. If so, the redo log entries can be written to a global log buffer at once at the end of a statement. In this way, the access frequency of transactions to the global log buffer can be reduced and this bottleneck can be reduced in significance. Many redo log entries can be written to the global log buffer at once, which can reduce the number of disk I/O operations required for transaction logging.

If transaction private log buffering is enabled, whenever a transaction changes data and creates an undo log entry, a change action can be performed to ensure consistency of a main memory-based DBMS. However, writing redo log entries can be delayed until the end of the statement. In other words, redo log entries that were created before a savepoint can be written later than the savepoint log in a log history. Consistent with implementations of the current subject matter, a redo algorithm for use in crash recovery of in-memory databases can be modified as follows. For example, a redo log entry can advantageously be applied into a database when its savepoint count is bigger than a savepoint count of the page. This approach can be taken because the redo operation in not an idempotent operation (e.g. a redo operation cannot be applied multiple times without changing the result beyond the initial application). Redo log entries that have already been applied into a database advantageously do not perform an undo operation. This feature can be included because when a latest savepoint is running, undo log entries are already stored to the undo space. These undo log entries can be applied into the database during an undo phase in crash recovery.

FIG. 1 shows a diagram 100 illustrating features of a main memory-based DBMS 102 and data elements or other characteristics of database manipulation operations consistent with implementations of the current subject matter in which private log buffering occurs in the context of each transaction. One or more database clients 104 (e.g. remote machines, terminals, mobile devices, etc. that are capable of accessing the main memory-based DMBS 102) can use data manipulation language (DML) statements (e.g. Insert, Update, Delete) or other statements in appropriate formats for communicating with the main memory-based DBMS 102, for example by providing a database manipulation workload 106. Each statement of the database manipulation workload 106 can be processed in the context of a write operation 110, which creates one or more transactions 112A, 112B, 112C for updating records in one or more data pages of a database managed by the main memory-based DBMS 102. In other words, the data manipulation workload 106 can relate to (e.g. require) a write operation that requires one or more discrete transactions 112A, 112B, 112C (e.g. write, delete, modify, etc.) for updating a record or records of a table or other database structure managed by the main memory-based DBMS 102.

Transaction log entries for each transaction 112A, 112B, 112C can be stored to a private log buffer 114A, 114B, 114C in the context of each transaction. For example, a transaction can include a number of data changes in one or more tables. For each such data change, a transaction log entry can be recorded into a private log buffer 114A, 114B, 114C corresponding to the transaction. The transaction log entries stored to a private log buffer 114A, 114B, 114C can in turn be flushed to a global log buffer 116 at the end of the statement relating to that transaction. During a commit operation, transaction log entries previously written to the global log buffer 116 can be flushed to non-volatile storage 120 (e.g. one or more hard disk drives, optical drives, solid state drives, or any other kind of persistent storage device or devices), for example by a log flusher 122 or similar functionality.

Transaction private log buffering as described herein can eliminate or at least reduce the impact of one of the serious bottlenecks for global log buffer between transactions in previously available approaches to reliability guarantees in a main memory-based DBMS. Use of the WAL protocol and the FLAC rule can be maintained as in previous approaches such that high performance of transaction processing can be provided without negatively affecting reliability.

Figure 2:
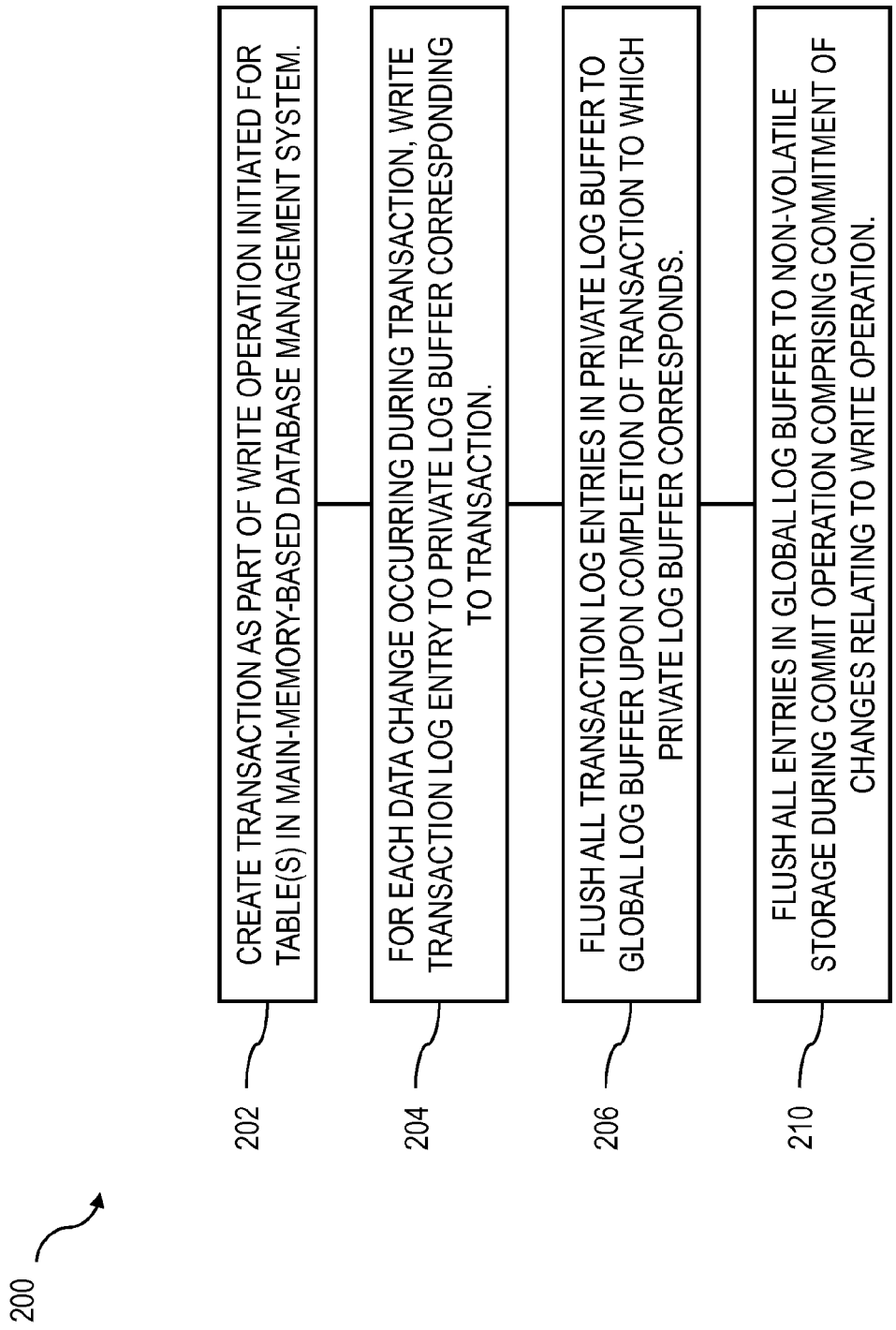
FIG. 2 shows a process flow chart illustrating features of a method consistent with implementations of the current subject matter.

FIG. 2 shows a process flow chart 200 illustrating features of methods consistent with one or more implementations of the current subject matter. At 202, one or more transactions are created as part of a write operation initiated for one or more tables in a main-memory-based DBMS. A data manipulation workload received from a client machine can relate to (e.g. initiate, etc.) the write operation. At 204, a transaction log entry is written to a private log buffer for each data change occurring during a transaction of the one or more transactions. The private log buffer corresponds to the transaction. The data manipulation workload can include statements in a data manipulation language or optionally in some other format.

All transaction log entries in the private log buffer are flushed to a global log buffer at 206 upon completion of the transaction to which the private log buffer corresponds. In some optional variations, all entries in the global log buffer are flushed to a non-volatile storage at 210 during a commit operation that includes commitment of changes relating to the write operation. In one example, the transaction log entry can be a redo log entry, and the redo log entry can be applied when the redo log entry has a higher savepoint count than a savepoint count of a data page affected by the transaction.

Figure 3:
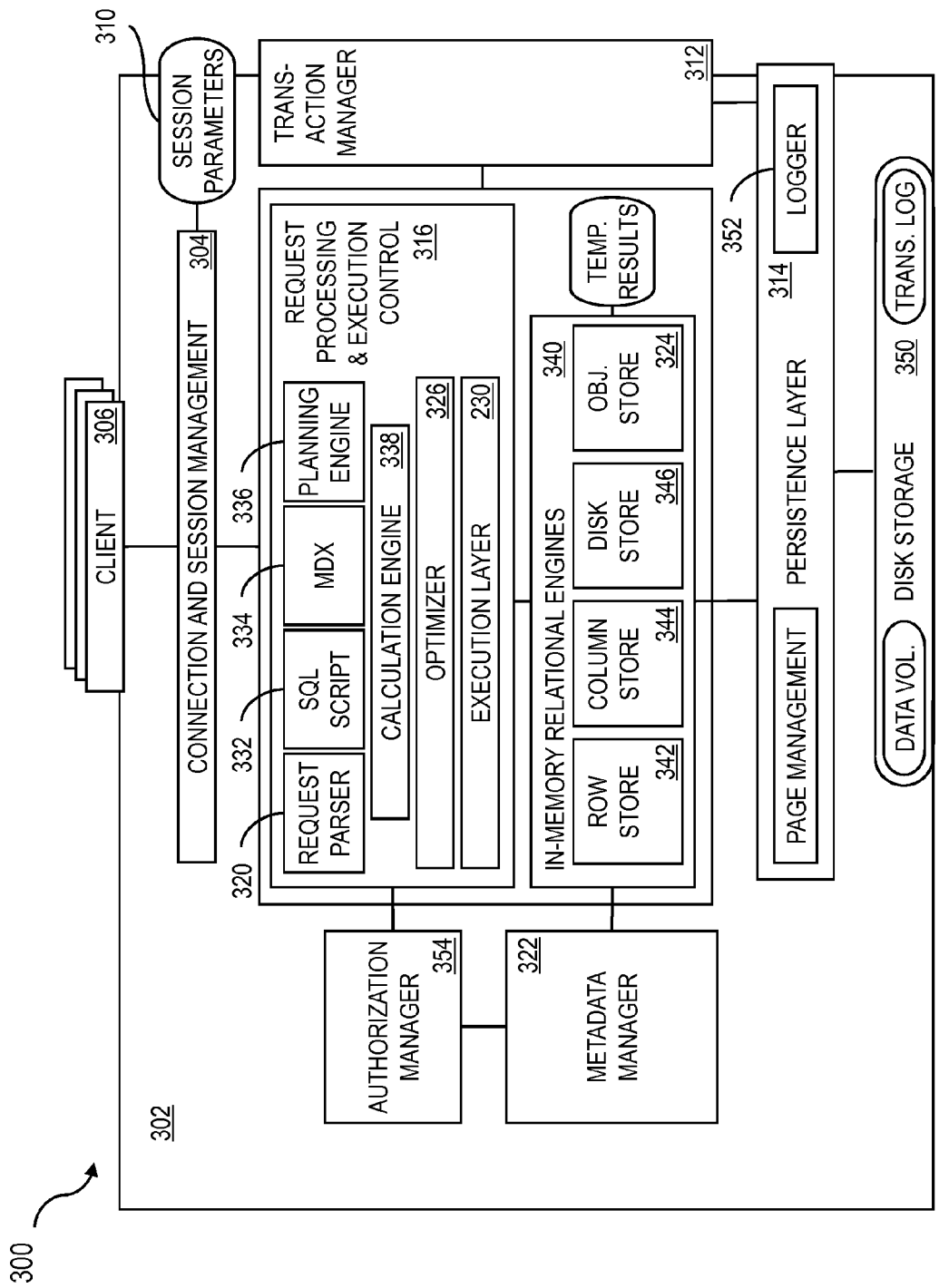
FIG. 3 shows a diagram illustrating features of a representative main memory based DBMS.

FIG. 3 shows a block diagram of an in-memory relational database server 300 consistent with implementations of the current subject matter. An in-memory relational database server 300 is an example of the implementation entity of FIG. 6. A connection and session management component 302 of an in-memory database system 304 creates and manages sessions and connections for the database clients 306. For each session a set of parameters 310 is maintained such as for example auto commit settings or the current transaction isolation level. Once a session is established, database clients 306 can use logical (e.g. SQL) statements to communicate with the in-memory database system 304. For analytical applications the multidimensional query language MDX can also be supported.

Each statement can be processed in the context of a transaction. New sessions can be implicitly assigned to a new transaction. A transaction manager 312 can coordinate transactions, control transactional isolation, and keep track of running and closed transactions. When a transaction is committed or rolled back, the transaction manager 312 can inform the involved engines about this event so they can execute necessary actions. The transaction manager 312 can cooperate with a persistence layer to achieve atomic and durable transactions.

Requests received from the database clients 306 can be analyzed and executed by a set of request processing and execution control components 316, which can include a request parser 320 that analyses a request from a database client 306 and dispatches it to a responsible component. Transaction control statements can, for example, be forwarded to the transaction manager 312, data definition statements can be dispatched to a metadata manager 322 and object invocations can be forwarded to an in-memory object store 324. Data manipulation statements can be forwarded to an optimizer 326, which creates an optimized execution plan that is provided to an execution layer 330. The execution layer 330 can act as a controller that invokes the different engines and routes intermediate results to a next phase in execution of the execution plan.

Built-in support can be offered for domain-specific models (such as for financial planning) scripting capabilities that allow to run application-specific calculations inside an in-memory database system. A scripting language, for example SQL Script 332, which is based on side effect free functions that operate on tables using SQL queries for set processing, can be used to enable optimizations and parallelization. The MDX language 334 can be used to provide support for multidimensional queries. A planning engine 336 can allow financial planning applications to execute basic planning operations in the database layer. An example of a basic planning operation is to create a new version of a data set as a copy of an existing one while applying filters and transformations. For example, planning data for a new year can be created as a copy of the data from the previous year. This operation requires filtering by year and updating the time dimension. Another example of a planning operation can be a disaggregation operation that distributes target values from higher to lower aggregation levels based on a distribution function.

Features such as SQL Script 332, MDX 334, and planning engine 336 operations can be implemented using a common infrastructure called a calculation engine 338. Metadata can be accessed via the metadata manager component 322. Metadata can include a variety of objects, such as for example definitions of relational tables, columns, views, indexes, SQL Script functions, object store metadata, and the like. All of these types of metadata can be stored in a common catalog for all stores (in-memory row store, in-memory column store, object store, disk based). Metadata can be stored in tables in row store. In multi-tenant systems and in distributed systems, central metadata can be shared across servers and tenants as discussed in greater detail below. How metadata is stored and shared can be hidden from the components that use the metadata manager 322.

One or more relational engines 340, for example an in-memory row store 342, an in-memory column store 344, a disk-based store 346, and the in-memory object store 324 mentioned above can communicate with the request processing and execution control components 316, the metadata manager 322, and the in-memory persistence layer 314. The row store 342 and column store 344 are each relational in-memory data engines that can store data in a row-based or column-based way, respectively. Some data, such as for example tracing data, need not be kept in memory all the time. The disk-based store 346 can handle such data. Data in the disk-based store 146 can be primarily stored in disk storage 350 and only moved to memory buffers (e.g. the persistence layer 314) when accessed.

When a table is created, the table can be specified in the store in which it is located. Table can be moved to different stores at a time after their creation. Certain SQL extensions can optionally be available only for specific stores (such as for example the "merge" command for a column store). However, standard SQL can be used on all tables. It is also possible to combine tables from different stores in one statement (e.g. using a join, sub query, union, or the like).

As row based tables and columnar tables can be combined in one SQL statement, the corresponding engines must be able to consume intermediate results created by the other. Two engines can differ in the way they process data. Row store operations, for example, can process data in a row-at-a-time fashion using iterators. Column store operations (such as for example scan, aggregate, and so on) can require that the entire column is available in contiguous memory locations. To exchange intermediate results, a row store can provide results to a column store materialized as complete rows in memory while a column store can expose results using the iterator interface needed by a row store.

The persistence layer 314 can be responsible for durability and atomicity of transactions and can ensure that the database is restored to the most recent committed state after a restart and that transactions are either completely executed or completely undone. To achieve this goal in an efficient way, the persistence layer 314 can use a combination of write-ahead logs, shadow paging and save points. The persistence layer 314 can offer interfaces for writing and reading data and can also contain a logger 352 that manages the transaction log. Log entries can be written implicitly by the persistence layer 314 when data are written via a persistence interface or explicitly by using a log interface.

An authorization manager 354 can be invoked by other components of the architecture to check whether a user has the required privileges to execute the requested operations. Privileges can be granted to users or roles. A privilege grants the right to perform a specified operation (such as for example create, update, select, execute, and the like) on a specified object (such as for example a table, view, SQL Script function, and the like). Analytic privileges that represent filters or hierarchy drill down limitations for analytical queries can also be supported. Analytical privileges can grant access to values with a certain combination of dimension attributes. This could for example be used to restrict access to a cube with sales data to values with dimension attributes such as region="US" and year="2010."

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:

creating one or more transactions as part of a write operation initiated for one or more tables in a main-memory-based database management system, wherein the one or more tables in the main-memory-based database management system are stored in memory;

writing, for each data change occurring during a transaction of the one or more transactions, a transaction log entry to a private log buffer, the private log buffer corresponding to the transaction;

flushing all transaction log entries in the private log buffer to a global log buffer, when the main-memory-based database management system has processed one or more data manipulation language statements comprising the transaction to which the private log buffer corresponds; and flushing, to a non-volatile storage, all transaction log entries in the global log buffer, the flushing of all the transaction log entries in the global log buffer to the non-volatile storage performed during a commit operation committing the changes relating to the write operation, the flushing of all the transaction log entries in the global log buffer to the non-volatile storage during the commit operation resulting in fewer input/output operations to the non-volatile storage for transaction logging than writing the transaction log entries directly to the non-volatile storage.

2. A computer program product as in claim 1, wherein the operations further comprise receiving a data manipulation workload from a client machine, the data manipulation workload relating to the write operation.

3. A computer program product as in claim 2, wherein the data manipulation workload comprises statements in a data manipulation language.

4. A computer program product as in claim 1, wherein the transaction log entry comprises a redo log entry, and the redo log entry is applied when the redo log entry has a higher savepoint count than a savepoint count of a data page affected by the transaction.

5. A system comprising:
at least one processor; and
at least one memory including program code which when executed by the at least one processor provides operations comprising:
creating one or more transactions as part of a write operation initiated for one or more tables in a main-memory-based database management system, wherein the one or more tables in the main-memory-based database management system are stored in memory;
writing, for each data change occurring during a transaction of the one or more transactions, a transaction log entry to a private log buffer, the private log buffer corresponding to the transaction;
flushing all transaction log entries in the private log buffer to a global log buffer, when the main-memory-based database management system has processed one or more data manipulation language statements comprising the transaction to which the private log buffer corresponds; and
flushing, to a non-volatile storage, all transaction log entries in the global log buffer, the flushing of all the transaction log entries in the global log buffer to the non-volatile storage performed during a commit operation committing the changes relating to the write operation, the flushing of all the transaction log entries in the global log buffer to the non-volatile storage during the commit operation resulting in fewer input/output operations to the non-volatile storage for transaction logging than writing the transaction log entries directly to the non-volatile storage.

6. A system as in claim 5, wherein the operations further comprise receiving a data manipulation workload from a client machine, the data manipulation workload relating to the write operation.

7. A system as in claim 6, wherein the data manipulation workload comprises statements in a data manipulation language.

8. A system as in claim 5, wherein the transaction log entry comprises a redo log entry, and the redo log entry is applied when the redo log entry has a higher savepoint count than a savepoint count of a data page affected by the transaction.

9. A system as in claim 5, wherein the computer hardware comprises a programmable processor, and a machine-readable medium storing instructions that, when executed by the programmable processor, cause the at least one programmable processor to perform at least some of the operations.

10. A computer-implemented method comprising:
creating one or more transactions as part of a write operation initiated for one or more tables in a main-memory-based database management system, wherein the one or more tables in the main-memory-based database management system are stored in memory;
writing, for each data change occurring during a transaction of the one or more transactions, a transaction log entry to a private log buffer, the private log buffer corresponding to the transaction;
flushing all transaction log entries in the private log buffer to a global log buffer, when the main-memory-based database management system has processed one or more data manipulation language statements comprising the transaction to which the private log buffer corresponds; and
flushing, to a non-volatile storage, all transaction log entries in the global log buffer, the flushing of all the transaction log entries in the global log buffer to the non-volatile storage performed during a commit operation committing the changes relating to the write operation, the flushing of all the transaction log entries in the global log buffer to the non-volatile storage during the commit operation resulting in fewer input/output operations to the non-volatile storage for transaction logging than writing the transaction log entries directly to the non-volatile storage.

11. A computer-implemented method as in claim 10, further comprising receiving a data manipulation workload from a client machine, the data manipulation workload relating to the write operation.

12. A computer-implemented method as in claim 11, wherein the data manipulation workload comprises statements in a data manipulation language.

13. A computer-implemented method as in claim 10, wherein the transaction log entry comprises a redo log entry, and the redo log entry is applied when the redo log entry has a higher savepoint count than a savepoint count of a data page affected by the transaction.

14. A computer-implemented method as in claim 10, wherein the creating, the writing, the flushing to the global log buffer, and the flushing to the non-volatile memory comprise operations performed by computer hardware.

* * * * *